US008654957B2

(12) United States Patent
Lu et al.

(10) Patent No.: US 8,654,957 B2
(45) Date of Patent: Feb. 18, 2014

(54) METHOD AND APPARATUS FOR PROVIDING INTERNET PROTOCOL SERVICES TO A USER OF A PRIVATE BRANCH EXCHANGE

(75) Inventors: Min Lu, Freehold, NJ (US); Leticia Johnson, Helotes, TX (US); Stephanie Parlamas, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1131 days.

(21) Appl. No.: 12/254,902

(22) Filed: Oct. 21, 2008

(65) Prior Publication Data

US 2010/0098054 A1   Apr. 22, 2010

(51) Int. Cl.
*H04M 3/42* (2006.01)
*H04M 7/00* (2006.01)

(52) U.S. Cl.
USPC ............ 379/207.05; 379/207.08; 379/221.01

(58) Field of Classification Search
USPC ............ 379/202.01, 207.04–207.08, 221.01; 370/352–356
See application file for complete search history.

(56) References Cited

U.S. PATENT DOCUMENTS

| 7,065,197 | B1 * | 6/2006 | Ramella-Pezza et al. ................. 379/201.02 |
| 7,933,397 | B2 * | 4/2011 | Jain ........................ 379/215.01 |
| 2003/0215080 | A1 * | 11/2003 | Wengrovitz ................ 379/219 |
| 2004/0001580 | A1 * | 1/2004 | Mason ................... 379/207.04 |

* cited by examiner

*Primary Examiner* — Ahmad Matar
*Assistant Examiner* — Nafiz E Hoque

(57) ABSTRACT

A method and apparatus for providing one or more Internet Protocol (IP) services to users of a private branch exchange (PBX) in a network are disclosed. For example, the method receives user phone information from the private branch exchange (PBX) via a data feed, and stores the user phone information in a storage device located within the network.

5 Claims, 4 Drawing Sheets

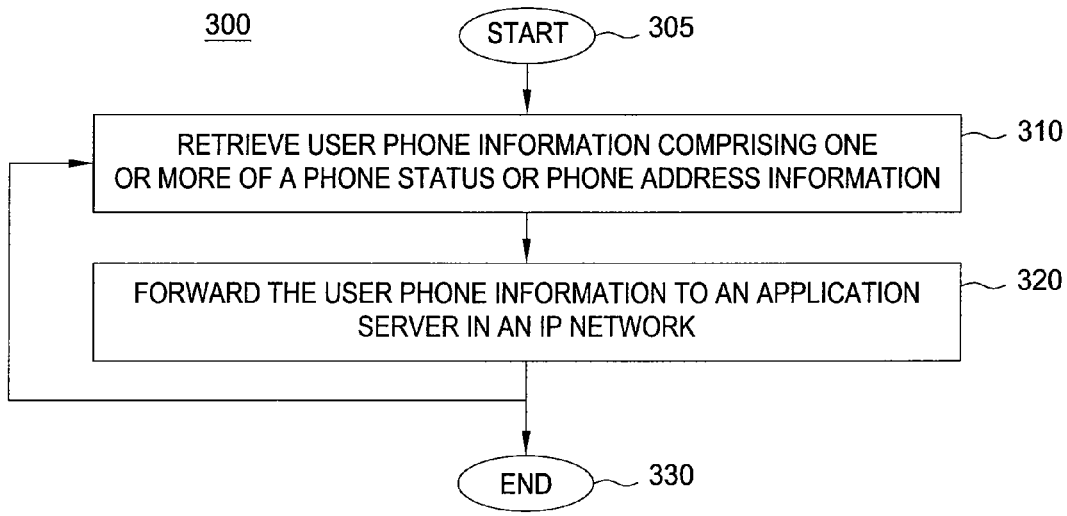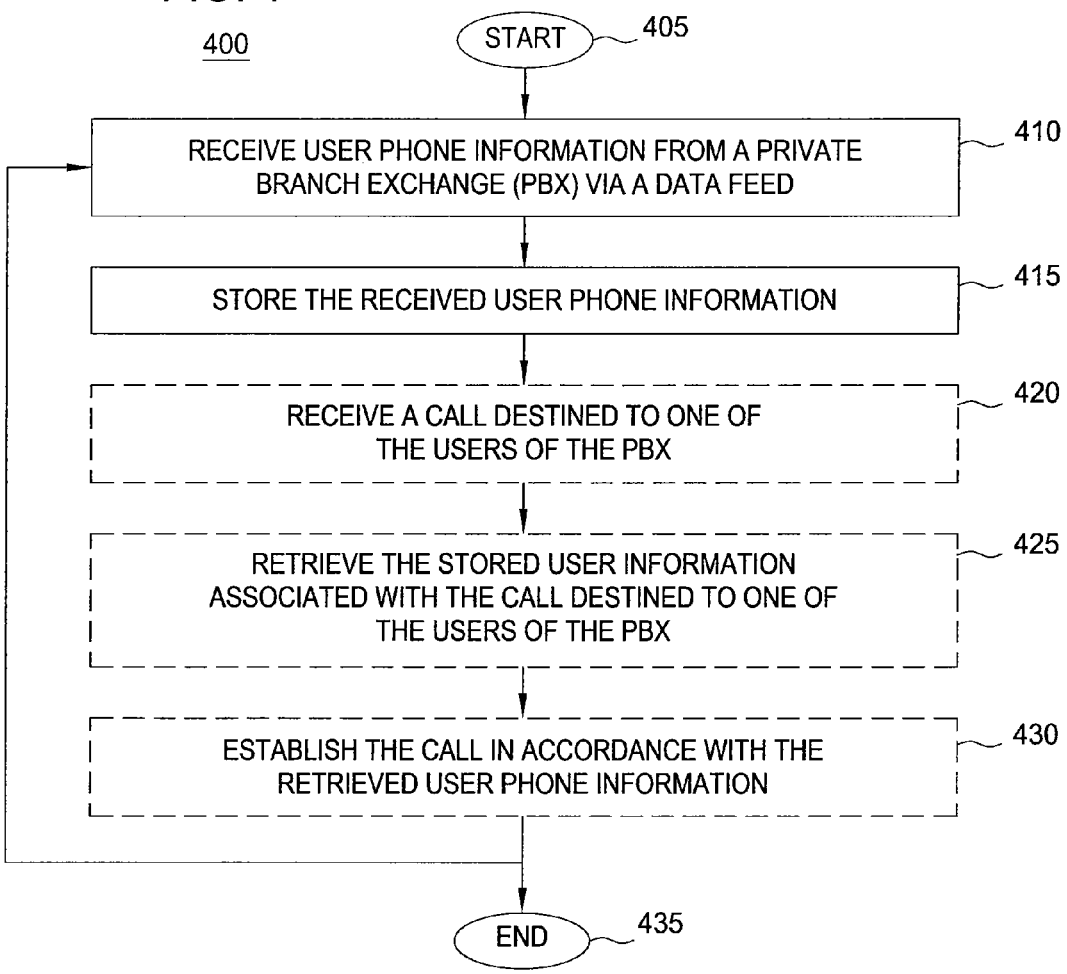

METHOD AND APPARATUS FOR PROVIDING INTERNET PROTOCOL SERVICES TO A USER OF A PRIVATE BRANCH EXCHANGE

The present invention relates generally to communication networks and, more particularly, to a method and apparatus for providing Internet Protocol (IP) based services to one or more users of a Private Branch Exchange (PBX).

BACKGROUND OF THE INVENTION

Businesses spend tremendous amount of resources to reduce their cost of doing business. For example, businesses need to subscribe to network services to enable communication among employees, customers, vendors, etc. However, as the business grows the number of users (e.g., employees) who need to be connected to the communications infrastructure will increase accordingly. Businesses may then wish to deploy a Private Branch Exchange (PBX) to enable users to share a specific number of external lines.

For example, a PBX may serve a large number of internal extension numbers while having access to only a few external lines, thereby enabling the users to share the few external lines. However, when an enterprise uses a PBX, the internal extension numbers and/or users are unknown to the network service provider. Thus, an IP service provider may not be able to provide various services to these users, where knowledge of the users is confined within the PBX environment.

SUMMARY OF THE INVENTION

In one embodiment, the present invention discloses a method and apparatus for providing Internet Protocol (IP) based services to one or more users of a Private Branch Exchange (PBX). For example, the method receives user phone information from the private branch exchange (PBX) via a data feed, and stores the user phone information in a storage device located within the network.

BRIEF DESCRIPTION OF THE DRAWINGS

The teaching of the present invention can be readily understood by considering the following detailed description in conjunction with the accompanying drawings, in which:

FIG. 3 illustrates a flowchart of a method for providing phone information by a PBX to an Internet Protocol (IP) network;

FIG. 4 illustrates a flowchart of a method for providing Internet Protocol (IP) services to users of a PBX.

To facilitate understanding, identical reference numerals have been used, where possible, to designate identical elements that are common to the figures.

DETAILED DESCRIPTION

Figure 1:
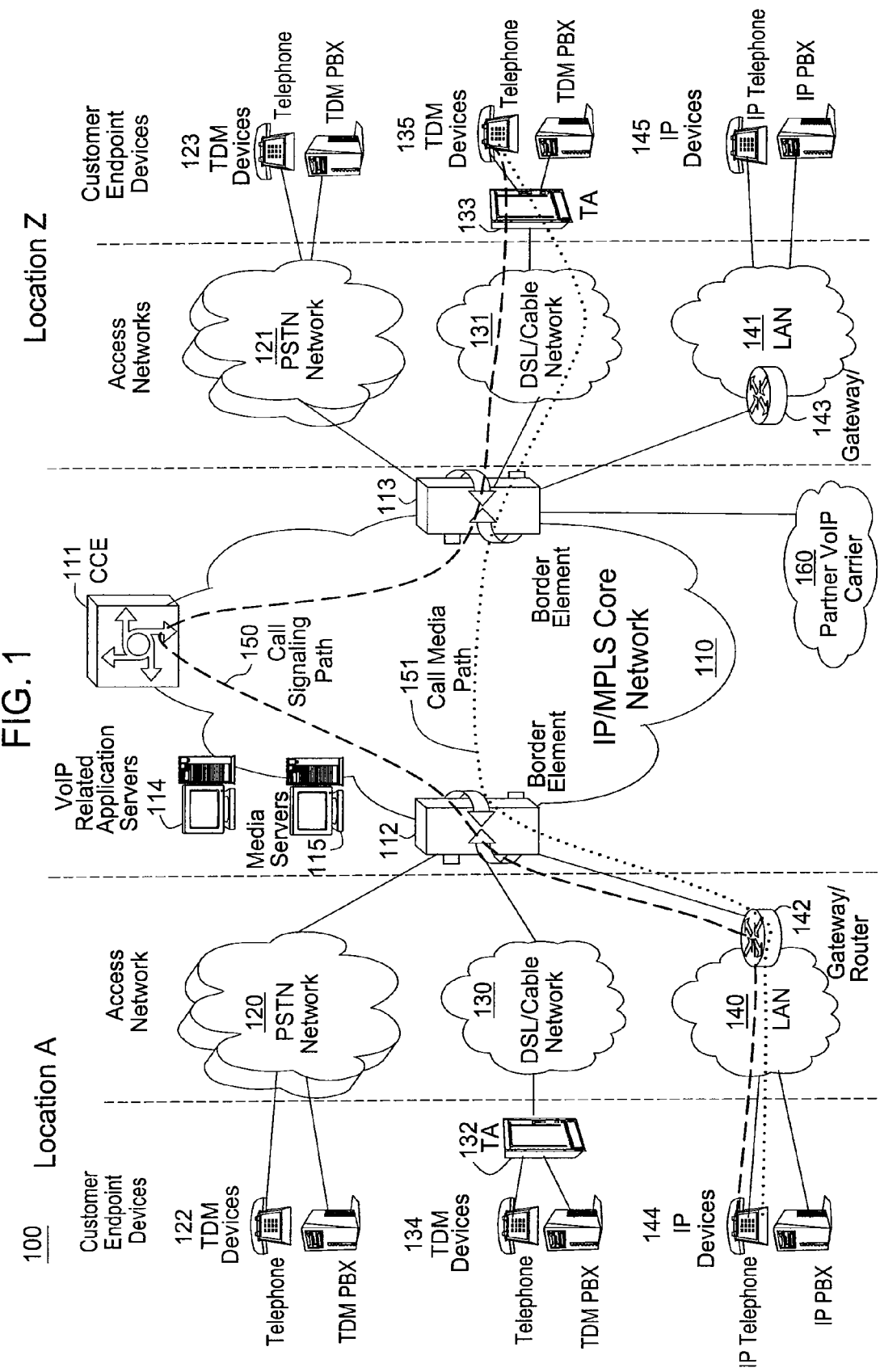
FIG. 1 illustrates a block diagram depicting an exemplary network related to the current invention.

The present invention broadly discloses a method and apparatus for providing Internet Protocol (IP) services to users of a Private Branch Exchange (PBX). To better understand the present invention, FIG. 1 illustrates is a block diagram depicting an exemplary network 100 related to the current invention. Exemplary networks include Internet protocol (IP) networks, Asynchronous Transfer Mode (ATM) networks, frame-relay networks, and the like. An IP network is broadly defined as a network that uses Internet Protocol to exchange data packets. Thus, an Internet Protocol (IP) Multimedia Subsystem (IMS) network, a VoIP network or a SoIP (Service over Internet Protocol) network is an IP network.

In one embodiment, the network 100 comprises various types of customer endpoint devices connected via various types of access networks to a carrier (a service provider) core infrastructure over an Internet Protocol based core backbone network. Broadly defined, a VoIP or SoIP network is a network that is capable of carrying packetized data for voice or other data services over the IP network. The present invention is described below in the context of an illustrative VoIP network. Thus, the present invention should not be interpreted as limited by this particular illustrative architecture.

In one embodiment, the customer endpoint devices can be either Time Division Multiplexing (TDM) based or IP based. TDM based customer endpoint devices 122, 123, 134 and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access network can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The IP core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. It should be noted that various network terms such as "CCE" and "CCE functions" should be broadly interpreted and should not be interpreted as a limitation of the present invention. In other words, different types of networks will use different terms to represent the same or similar functions. For example, "CCE functions" can be referred to as "Serving-Call Session Control Function (S-CSCF)" in an IMS network and so on.

For calls that originate or terminate in a different carrier, they can be handled through the PSTN 120 and 121, or the Partner VoIP Carrier 160. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which customers may transmit and receive packets for various types of communications services, e.g., VoIP services. An enterprise customer may deploy a Private Branch eXchange (PBX) to enable multiple users to share lines towards the network service provider. A PBX refers to a telephone device within an enterprise that switches calls between enterprise users on lines internal to the enterprise while allowing all users to share a certain (fewer) number of external phone lines. For example, the number of external lines may be a small fraction (e.g., 10%) of the number of users supported by the PBX. The main purpose of a PBX is to avoid the need for having one external line for each user connected to a network service provider.

For example, the enterprise customer may have a large number of users, e.g., 500 users, behind a PBX switch sharing a smaller number of lines, e.g., 20 lines, towards a network service provider. The PBX may then be used to manage connections to the 500 extension numbers within the enterprise. However, the network service provider may have no knowledge of the extensions and/or status associated with each of the extensions. For example, the network service provider may be unaware of which users/extensions are busy, idle, etc. In one embodiment, the enterprise customer may wish to permit all users behind the PBX to have access to services provided by the network service provider. However, the service provider may require knowledge unavailable outside of the enterprise network.

In one embodiment, the present invention provides a method and an apparatus for providing IP network based services to users of a PBX. The network based services may be provided on an IP Multimedia Subsystem (IMS) network architecture. IP Multimedia Subsystem (IMS) refers to an IP network architecture for providing multimedia and Voice over IP (VoIP) services in accordance with network standards defined by $3^{rd}$ Generation Partnership Project (3GPP). IMS supports multiple wireless and wirebased network access protocols or architectures, e.g., Global System for Mobile Communication (GSM), Wideband Code Division Multiple Access (WCDMA), Wireless Local Area Network (WLAN), wirebased broadband access networks, ATM/FR networks, etc.

Figure 2:
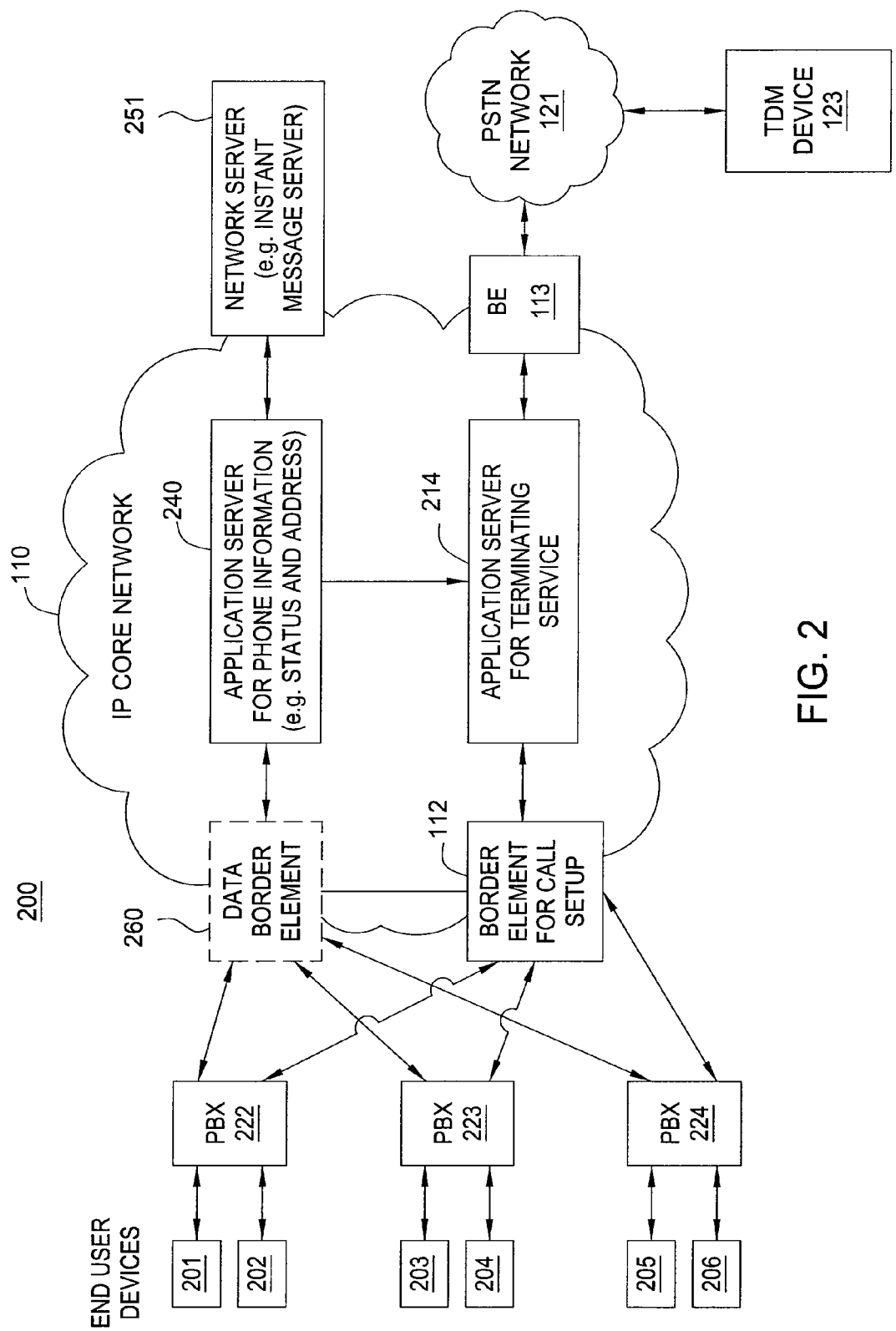
FIG. 2 illustrates an exemplary network with the current invention for providing Internet Protocol (IP) services to users of a PBX.

FIG. 2 illustrates an exemplary network 200 in accordance with the current invention for providing IP services to users of a PBX. For example, end user devices 201-206 are deployed at an enterprise customer location for accessing communications services, e.g., VoIP services, from the IP core network 110. Each of the end user devices 201-206 is connected to the IP core network 110 through a respective PBX 222, 223 or 224 and a BE 112. Similarly, TDM device 123 (e.g., a phone) is accessing services from IP core network 110 via PSTN network 121 and BE 113. Calls originated by end user devices 201-206 traverse the IP core network 110 from BE 112 towards their destination. Calls originated by TDM device 123 traverse the IP core network 110 from BE 113 towards their destination.

In one embodiment, the IP core network 110 also employs an application server for storing phone information 240 (broadly a storage device), a network server 251 (e.g. Instant Message (IM) server), an application server for terminating services 214 and a Data Border Element (DBE) 260. The PBXs 222, 223 and 224 communicate with the application server for phone information 240 located in the IP core network 110 via the DBE 260. The application server for storing phone information 240 is able to communicate with the application server for terminating service 214 and the network server 251.

In one embodiment, the Data Border Element (DBE) 260 is used for enabling PBXs to communicate phone information (described further below) about users (e.g., end users) to the application server 240 located in the IP core network 110. In other words, a data feed layer may be used to enable the PBXs to upload end user information to a server located in the IP core network. In one embodiment, the DBE is a separate and dedicated border element used only for providing the user data to the network. Namely, the DBE is not tasked with performing any other functions except for providing the user data to the network. In another embodiment, the DBE is implemented within a border element (e.g., within BE 112) that is also used for performing call setup and supporting a media path. Hence, the BE functionalities of BE 112 and DBE 260 may be implemented on the same network device or on separate dedicated network devices.

In one embodiment, the application server for storing phone information 240 is used for interacting with PBXs (e.g., PBXs 222-224) to obtain user phone information. For example, the user phone information may comprise one or more of: phone address information and/or phone status information of end user phones.

In one embodiment, the user's phone status information may indicate whether or not the user is busy or idle. In another embodiment, the user phone status information may comprise more detailed information. For example, the phone status information may comprise indication(s) for one or more of: a busy while on a call status, a busy while on a conference call status, a busy while accepting new incoming calls via call waiting status, a busy while forwarding new incoming calls to voicemail status, an idle status, an idle while forwarding all incoming calls to voicemail status, an idle while forwarding all incoming calls to alternate number status, a transferring active call and will be free momentarily status, a transferring active call and will be free in a predefined amount of time (e.g., 30 seconds, one minute, and so on) status, a restricted access while accepting only selected incoming calls status, a restricted access while accepting calls with unrestricted caller ID status, or an accepting calls on a mobile device instead of a landline device status, etc. It should be noted that the present invention is not limited to these illustrative examples of phone status information.

In one embodiment, the user phone address information may indicate the user's extension number. In another embodiment, the user phone address information may comprise more detailed information. For example, the phone address information may comprise one or more of: a user extension number, an operator number for said user, whether or not said user is equipped with a Text Telephone (TTY) device, a desired calling name to be delivered on outbound calls for said user, a type of features to be invoked (e.g., call transfer, call forwarding, conference call, etc), a user email address, or an alternate user telephone number (e.g., a cell phone or a pager number), etc.

In one embodiment, the service provider provides IP services to users of a PBX by enabling the PBXs to publish user's (end user's) phone information to an application server located in the IP network. For example, the IP service provider may enable an enterprise customer to publish end user's phone status and user phone address information to be stored in application server 240. The enterprise customer's PBX may then interact with application server 240 via a DBE 260 to upload the phone status and address information. In turn, the application server for storing phone information 240 can be accessed by various other application servers providing terminating services, e.g., application server 214. The application server 240 may also obtain information from other network servers, e.g., IM server 251. The application server for storing phone information 240 may then consolidate all information received from PBXs and network servers to enable application servers that process calls, e.g., application server 214, to utilize the end user's current address and phone status information. One advantageous aspect of the present approach is that the application server 214 will be able to provide various IP services directly to the users, even though the users are serviced by a PBX. In other words, one or more IP services can now be provided to the user of a PBX because the user information is now made available to the IP service provider.

In one example, if the TDM device 123 originates a call towards a user and the user is currently reachable via the PBX 224, the application server 214 retrieves the current address and status information from the application server 240. The application server 214 is then able to perform the call setup towards the user via BE 112 and PBX 224. Being able to access the current address and status information for the called party will allow the application server 214 to provide one or more IP services.

For example, if a user behind the PBX wants all inbound calls to be forwarded directly to a voicemail server (not shown) and that a notification be sent to the user via an instant message of any such rerouted inbound calls, the application server 214 will be able to provide this service to the user by interacting with application server 240 and network server 251. In other words, the user's preference in rerouting the call will be obtained or received by the DBE 260 and stored in application server 240. Thus, even though the user is served by the PBX, the user's preference is made known to the application server 214 so that one or more IP services can now be provided to the user.

In one example, a PBX may publish its address book in the application server for storing phone information 240. If a user changes his/her extension, the PBX may then republish the new extension number. If the TDM device 123 then originates a call towards the user, the application server 214 may query the application server 240 to obtain the correct extension number. In this fashion, the call may then be setup towards the latest extension number.

In one embodiment, a customer may select the type of user phone status information and phone address information that will be made available to the callers. For example, an enterprise customer may prefer that callers will not be able to detect that a user of the enterprise customer has selected to forward calls to a voicemail service while the phone of the user is idle. In another example, an enterprise customer may select the end user's phone status or address information to be presented to the callers based on the caller's identity, time of day, etc. For example, callers who are also employees of the same enterprise customer may be informed when calls are being forwarded to voicemail while the status of the phone of the called number is determined to be idle, whereas callers who are customers of the enterprise customer will not be informed that the phone of called number is currently idle, and so on.

Those skilled in the art would realize that the end user's phone information (address and/or status) may vary over time. Such end user's phone information may change for various reasons such as changes in the user preference, changes in the type of IP services provided by the IP service provider, and so on. Thus, the above embodiments are only illustrative and should not be interpreted to limit the scope of the present invention.

FIG. 3 illustrates a flowchart of a method 300 for providing phone information by a PBX to an IP network. Method 300 starts in step 305 and proceeds to step 310.

In step 310, method 300 retrieves user phone information comprising one or more of: a phone status and/or phone address information. For example, the PBX retrieves phone address and/or status information from one or more user end devices such as phones. For example, an extension number may be updated, whether or not a user is reachable via mobility type services such as call forwarding may be updated, a phone may become busy or idle, etc.

In step 320, method 300 forwards the user phone information to an application server deployed in an IP network. For example, the method may provide the user phone information via a data feed, e.g., via a separate data border element, to an application server in the IP service provider's network. The method then proceeds to step 330 to end processing of the current phone information or return to step 310 to continue retrieving more user phone information.

FIG. 4 illustrates a flowchart of a method 400 for providing Internet Protocol (IP) services to users of a private branch exchange (PBX). For example, one or more steps of method 400 can be implemented by an application server for storing phone information 240. Method 400 starts in step 405 and proceeds to step 410.

In step 410, method 400 receives user phone information from a private branch exchange (PBX) via a data feed. For example, the phone status and address information of one or more users from a PBX may be received via a data border element.

In step 415, method 400 stores the received user phone information. For example, the application server for storing phone information stores the received phone status and address information in a database.

In optional step 420, method 400 receives a call destined to one of the users of the PBX. For example, an application server for terminating services 214 receives a call destined towards one of the users of the PBX.

In optional step 425, method 400 retrieves the stored user phone information associated with the call destined to one of the users of the PBX. For example, the application server for terminating services 214 may retrieve the user phone information stored in the database for the called user being served by the PBX.

In optional step 430, method 400 establishes the call in accordance with the retrieved user phone information. For example, if the retrieved phone information indicates that the user may be reached only for a specific type of call, e.g., emergency calls, the call is then processed according to the retrieved user phone information. In another example, if the user phone information indicates that the user is busy but call waiting is available, then the call may be processed accordingly and setup via the call waiting service. The method then ends in step 435 or returns to step 410 to continue receiving more user phone information.

It should be noted that although not specifically specified, one or more steps of methods 300 and 400 may include a storing, displaying and/or outputting step as required for a particular application. In other words, any data, records, fields, and/or intermediate results discussed in the method 300 or 400 can be stored, displayed and/or outputted to another device as required for a particular application. Furthermore, steps or blocks in FIG. 3 or FIG. 4 that recite a determining operation, or involve a decision, do not necessarily require that both branches of the determining operation be practiced. In other words, one of the branches of the determining operation can be deemed as an optional step.

Figure 5:
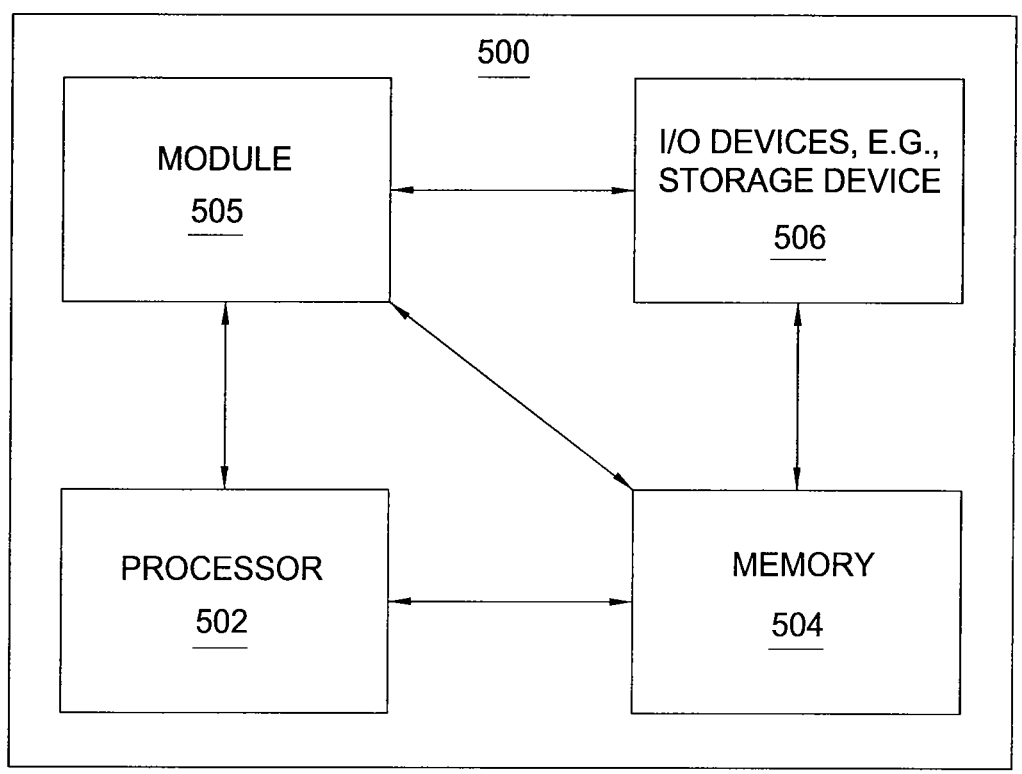
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing Internet Protocol (IP) services to users of a PBX in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module for providing Internet Protocol (IP) services to users of a PBX in a network or process 505 can be loaded into memory 504 and executed by processor 502 to implement the functions as discussed above. As such, the present method 505 for providing Internet Protocol (IP) services to users of a PBX in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing a call to a user of a private branch exchange, comprising:
   receiving by a processor deployed in a core network the call from a caller destined to the user;
   retrieving by the processor user phone information of the user from an application server deployed in the core network, wherein the application server stores the user phone information, wherein the application server has received the user phone information from the private branch exchange via a data feed, wherein the data feed is implemented in a connection that is separate from a connection used to connect calls to the private branch exchange, wherein the data feed is implemented via a data border element deployed in the core network, wherein the data border element receives the user phone information from the private branch exchange and forwards the user phone information to the application server, wherein the user phone information comprises phone status information, wherein the user selects the phone status information desired to be provided to the caller, wherein the phone status information indicates whether or not the user is busy or idle, wherein the phone status information comprises an idle while forwarding all incoming calls to voicemail status, and wherein an administrator of the private branch exchange selects whether to provide the phone status information to the caller; and
   establishing by the processor the call in accordance with the user phone information, wherein the establishing comprises:

forwarding the call to a voicemail server; and
notifying the user via an instant message, wherein the caller does not receive an indication that that the user is idle when the administrator has selected to not provide the phone status information comprising the idle while forwarding all incoming calls to voicemail status to the caller.

2. The method of claim 1, wherein the user phone information further comprises phone address information.

3. A non-transitory computer-readable medium storing instructions which, when executed by a processor deployed in a core network, cause the processor to perform operations for establishing a call to a user of a private branch exchange, the operations comprising:
receiving the call from a caller destined to the user;
retrieving user phone information of the user from an application server deployed in the core network, wherein the application server stores the user phone information, wherein the application server has received the user phone information from the private branch exchange via a data feed, wherein the data feed is implemented in a connection that is separate from a connection used to connect calls to the private branch exchange, wherein the data feed is implemented via a data border element deployed in the core network, wherein the data border element receives the user phone information from the private branch exchange and forwards the user phone information to the application server, wherein the user phone information comprises phone status information, wherein the user selects the phone status information desired to be provided to the caller, wherein the phone status information indicates whether or not the user is busy or idle, wherein the phone status information comprises an idle while forwarding all incoming calls to voicemail status, and wherein an administrator of the private branch exchange selects whether to provide the phone status information to the caller; and
establishing the call in accordance with the user phone information, wherein the establishing comprises:
forwarding the call to a voicemail server; and
notifying the user via an instant message, wherein the caller does not receive an indication that that the user is idle when the administrator has selected to not provide the phone status information comprising the idle while forwarding all incoming calls to voicemail status to the caller.

4. An apparatus for establishing a call to a user of a private branch exchange, comprising:
a processor deployed in a core network; and
a computer-readable medium storing instructions which, when executed by the processor, cause the processor to perform operations, the operations comprising:
receiving the call from a caller destined to the user,
retrieving user phone information of the user from an application server deployed in the core network, wherein the application server stores the user phone information, wherein the application server has received the user phone information from the private branch exchange via a data feed, wherein the data feed is implemented in a connection that is separate from a connection used to connect calls to the private branch exchange, wherein the data feed is implemented via a data border element deployed in the core network, wherein the data border element receives the user phone information from the private branch exchange and forwards the user phone information to the application server, wherein the user phone information comprises phone status information, wherein the user selects the phone status information desired to be provided to the caller, wherein the phone status information indicates whether or not the user is busy or idle, wherein the phone status information comprises an idle while forwarding all incoming calls to voicemail status, and wherein an administrator of the private branch exchange selects whether to provide the phone status information to the caller; and
establishing the call in accordance with the user phone information, wherein the establishing comprises:
forwarding the call to a voicemail server; and
notifying the user via an instant message, wherein the caller does not receive an indication that that the user is idle when the administrator has selected to not provide the phone status information comprising the idle while forwarding all incoming calls to voicemail status to the caller.

5. The method of claim 2, wherein the phone address information comprises a user extension number.

* * * * *